US012334650B2

(12) United States Patent
Kosaka

(10) Patent No.: US 12,334,650 B2
(45) Date of Patent: Jun. 17, 2025

(54) MULTI-RESONANT ANTENNA

(71) Applicant: JAPAN AVIATION ELECTRONICS INDUSTRY, LIMITED, Tokyo (JP)

(72) Inventor: Keishi Kosaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 7 days.

(21) Appl. No.: 17/573,285

(22) Filed: Jan. 11, 2022

(65) Prior Publication Data

US 2022/0271429 A1 Aug. 25, 2022

(30) Foreign Application Priority Data

Feb. 22, 2021 (JP) ................................ 2021-026166

(51) Int. Cl.
*H01Q 5/371* (2015.01)
*H01Q 1/38* (2006.01)

(52) U.S. Cl.
CPC ............... *H01Q 5/371* (2015.01); *H01Q 1/38* (2013.01)

(58) Field of Classification Search
CPC ........... H01Q 5/371; H01Q 1/38; H01Q 7/00; H01Q 15/0086; H01Q 13/16; H01Q 9/0464; H01Q 9/265
See application file for complete search history.

(56) References Cited

U.S. PATENT DOCUMENTS 7,352,326 B2 4/2008 Korva et al.
8,421,679 B2 4/2013 Suzuki et al.
9,496,616 B2 11/2016 Toyao
9,960,483 B2 * 5/2018 Toyao .................... H01Q 1/243
10,218,071 B2 2/2019 Toyao
D926,736 S 8/2021 Kosaka et al.
11,670,853 B2 * 6/2023 Wang ....................... H01Q 1/48 343/848
11,862,877 B2 1/2024 Kosaka et al.
2004/0080457 A1 4/2004 Guo et al.
2006/0279464 A1 12/2006 Mei
2006/0290569 A1 * 12/2006 Boyle .................... H01Q 1/243 343/702
2010/0033381 A1 * 2/2010 Liu ........................ H01Q 1/243 343/700 MS (Continued)

FOREIGN PATENT DOCUMENTS

CN 1875518 A 12/2006
CN 205646121 U 10/2016

(Continued)

OTHER PUBLICATIONS

Taiwanese Office Action (and English language translation thereof) dated Oct. 6, 2022, issued in counterpart Taiwanese Application No. 111100936.
Extended European Search Report (EESR) dated Jul. 5, 2022, issued in counterpart European Application No. 22151126.4.
European Office Action dated Mar. 28, 2023, issued in counterpart European Application No. 22151126.4.
Korean Office Action (and an English language translation thereof) dated Apr. 4, 2023, issued in counterpart Korean Application No. 10-2022-0008078 .

(Continued)

*Primary Examiner* — Dimary S Lopez Cruz
*Assistant Examiner* — Aladdin Abdulbaki
(74) *Attorney, Agent, or Firm* — Holtz, Holtz & Volek PC

(57) ABSTRACT

A multi-resonant antenna is provided with a main antenna and an additional radiation element. The main antenna is provided with a main portion, which forms a split ring, and a feeding portion, which branches off from the main portion. The additional radiation element extends outward of the main antenna from the main antenna.

9 Claims, 5 Drawing Sheets

(56) References Cited

U.S. PATENT DOCUMENTS

| | | | | |
|---|---|---|---|---|
| 2017/0294952 | A1* | 10/2017 | Uchida | H01Q 9/42 |
| 2022/0255223 | A1* | 8/2022 | Tran | H04L 67/535 |
| 2022/0255226 | A1* | 8/2022 | Wang | H01Q 1/48 |

FOREIGN PATENT DOCUMENTS

| | | | | | |
|---|---|---|---|---|---|
| JP | 2010206550 | A | | 9/2010 | |
| JP | 2015185910 | A | | 10/2015 | |
| JP | 6020451 | B2 | | 10/2016 | |
| JP | 2019047183 | A | * | 3/2019 | H01Q 9/04 |
| JP | 1647916 | S | | 12/2019 | |
| JP | 6624650 | B2 | | 12/2019 | |
| WO | WO-2018082558 | A1 | * | 5/2018 | H01Q 1/38 |
| WO | 2020137137 | A1 | | 7/2020 | |

OTHER PUBLICATIONS

European Office Action dated Sep. 19, 2023, issued in counterpart European Application No. 22151126.4.

Korean Office Action (and its English language translation thereof) dated Apr. 1, 2024, issued in counterpart Korean Application No. 10-2022-0008078.

Chinese Office Action (and an English language translation thereof) dated Nov. 21, 2024, issued in counterpart Chinese Application No. 202210051814.2.

Japanese Office Action (and an English language translation thereof) dated Oct. 30, 2024, issued in counterpart Japanese Application No. 2021-026166.

* cited by examiner

MULTI-RESONANT ANTENNA

CROSS REFERENCE TO RELATED APPLICATIONS

This application is based on and claims priority under 35 U.S.C. § 119 to Japanese Patent Application No. JP2021-026166 filed Feb. 22, 2021, the contents of which are incorporated herein in their entirety by reference.

BACKGROUND OF THE INVENTION

This invention relates to a multi-resonant antenna.

Japan Patent No. 6020451 (Patent Document 1) discloses a small and broadband antenna 900. As shown in FIG. 8, the antenna 900 of Patent Document 1 has a split ring resonator 910 using a split ring 920 which is a ring-shaped conductor with a split portion 922. Specifically, the antenna 900 of Patent Document 1 has a main portion 930, which forms the split ring 920, and a feeding portion 940. Here, the feeding portion 940 is provided to the main portion 930.

SUMMARY OF THE INVENTION

The antenna 900 of Patent Document 1 operates at a resonance frequency of the split ring resonator 910. In other words, the antenna 900 of Patent Document 1 resonates at only one operating frequency but cannot cope with a broad frequency band.

It is therefore an object of the present invention to provide an antenna having a structure which can resonate at a plurality of operation frequencies.

One aspect of the present invention provides a multi-resonant antenna which comprises a main antenna and an additional radiation element. The main antenna comprises a main portion, which forms a split ring, and a feeding portion, which branches off from the main portion. The additional radiation element extends outward of the main antenna from the main antenna.

The multi-resonant antenna is provided with the additional radiation element in addition to the main antenna. With this structure, the multi-resonant antenna of the present invention can resonate at both of an operating frequency of the first resonance portion and an operating frequency of the second resonance portion. In other words, the multi-resonant antenna of the present invention has a structure which can resonate at a plurality of operation frequencies.

An appreciation of the objectives of the present invention and a more complete understanding of its structure may be had by studying the following description of the preferred embodiment and by referring to the accompanying drawings.

Figure 1:
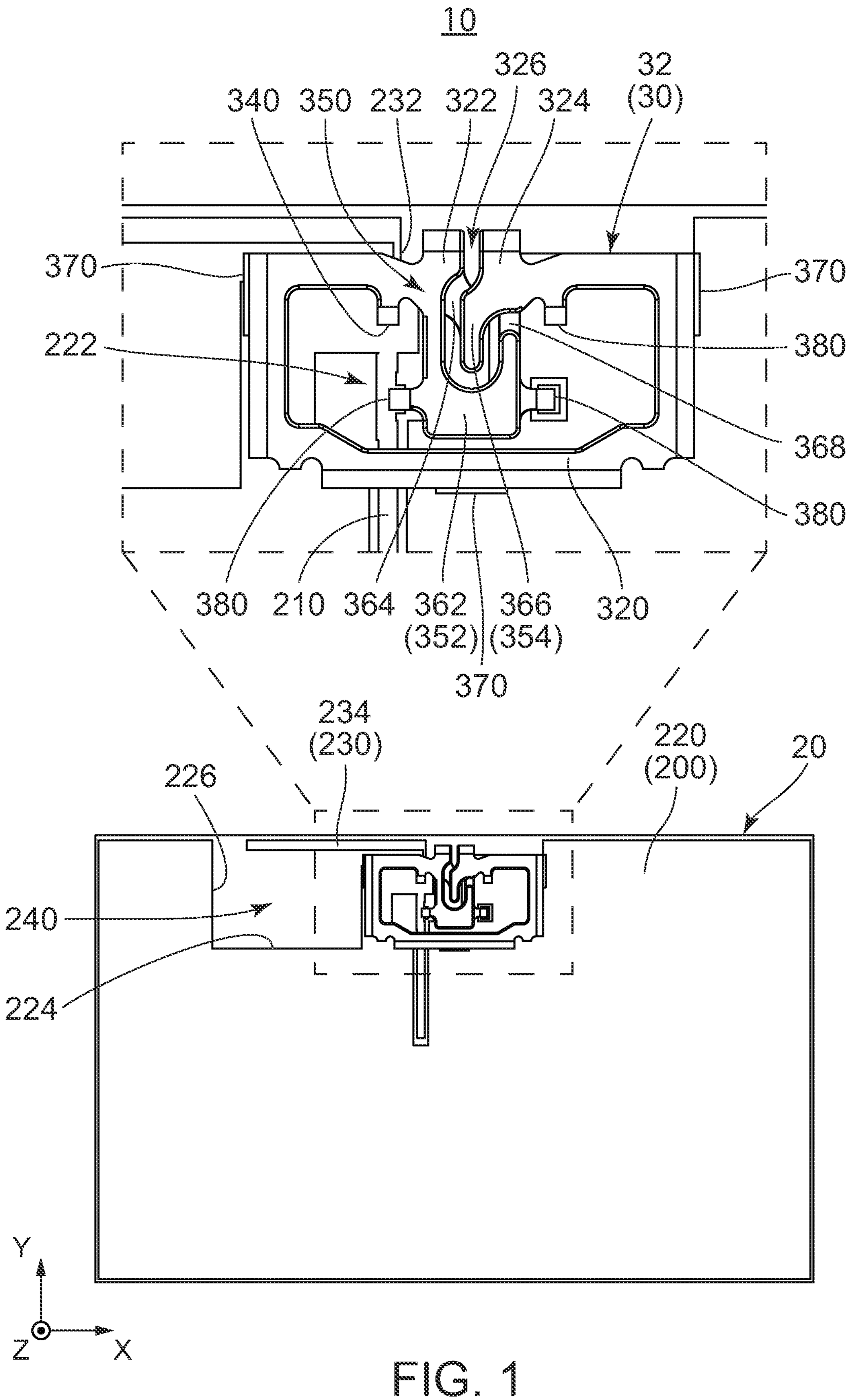
FIG. 1 is a plan view showing a multi-resonant antenna according to an embodiment of the present invention. An antenna component mounted on a circuit board and the vicinity thereof are shown on an enlarged scale.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, a multi-resonant antenna 10 according to an embodiment of the present invention is provided with a circuit board (a substrate) 20 and an antenna component 32. In the present embodiment, the antenna component 32 forms a main antenna 30 in part.

Figure 2:
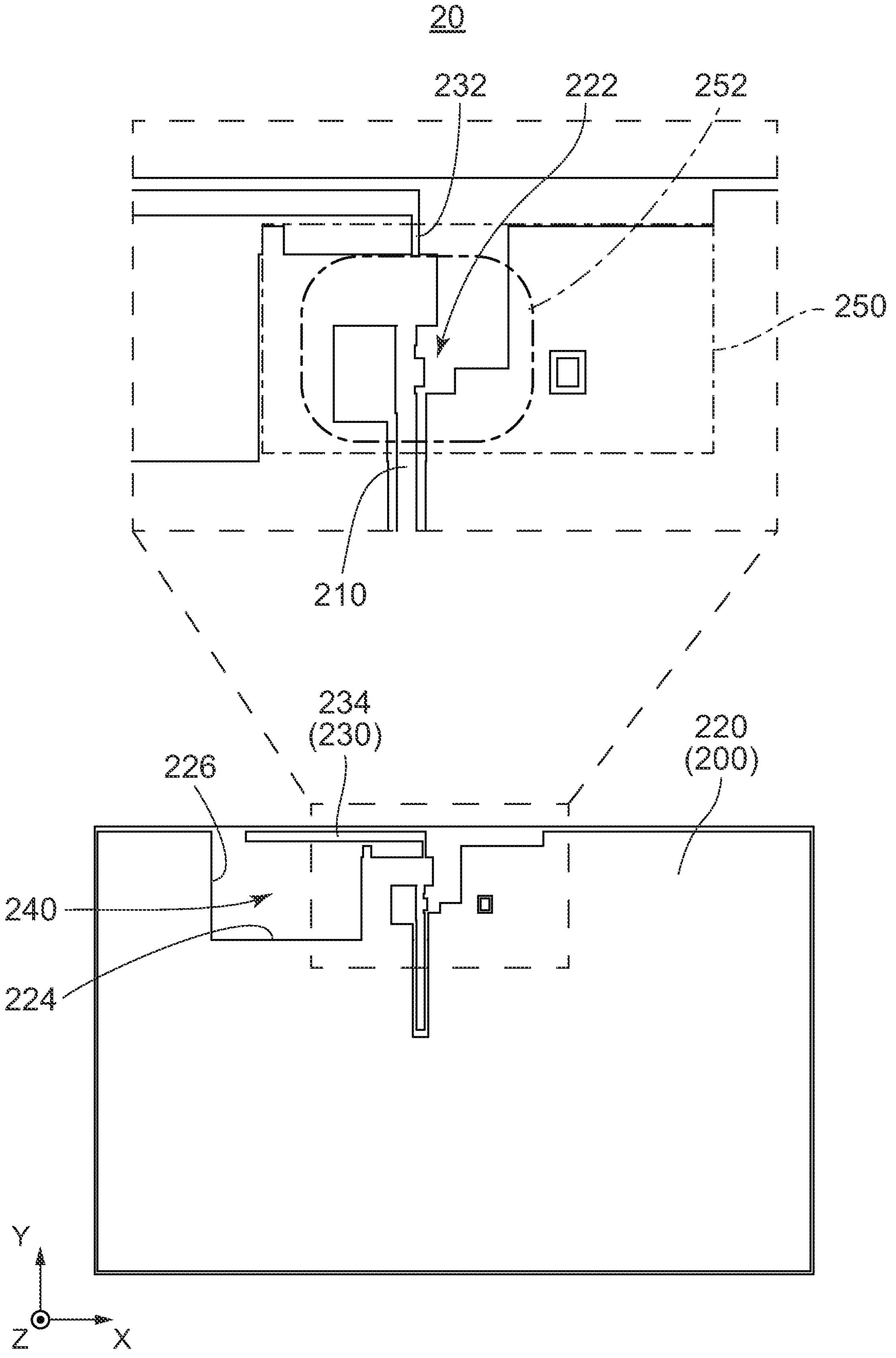
FIG. 2 is a plan view showing the circuit board included in the multi-resonant antenna of FIG. 1. A mount area on which the antenna component is mounted and the vicinity thereof are shown on an enlarged scale.

As shown in FIG. 2, the circuit board 20 of the present embodiment has a conductive pattern (a pattern) 200. The conductive pattern 200 includes a feeding portion 210, a ground pattern (a ground portion) 220 and an additional radiation element 230. Moreover, the conductive pattern 200 includes a first main portion 252, which forms the main antenna 30 in part. The first main portion 252 is in a mount area 250 on which the antenna component 32 is mounted. The first main portion 252 has a pattern shape decided according to a desired antenna characteristic. The first main portion 252 forms the main antenna 30 together with the antenna component 32 mounted on the circuit board 20. Thus, the multi-resonant antenna 10 of the present embodiment is provided with the main antenna 30 and the additional radiation element 230.

As understood from FIGS. 1 and 2, the antenna component 32 of the present embodiment is formed of a metal member which is mounted on the circuit board 20 when used. In other words, the antenna component 32 is a discrete component which is mounted on the circuit board 20 when used. However, the present invention is not limited thereto. The antenna component 32 of the present invention may be formed by other methods, such as plating a resin body with a metal film or sticking a metal member on a resin body.

As understood from FIGS. 1 and 2, in the present embodiment, the main antenna 30 is formed of the antenna component 32 and a part of the conductive pattern 200 (the first main portion 252) of the circuit board 20. However, the present invention is not limited thereto. The main antenna 30 may be formed of the antenna component 32 alone. Alternatively, the main antenna 30 may be formed of one or more conductive layers included in the circuit board 20. For example, the main antenna 30 may be formed by using a multilayer wiring substrate as the circuit board 20 and using a plurality of conductive layers and a plurality of vias which are included in the multilayer wiring substrate.

Figure 3:
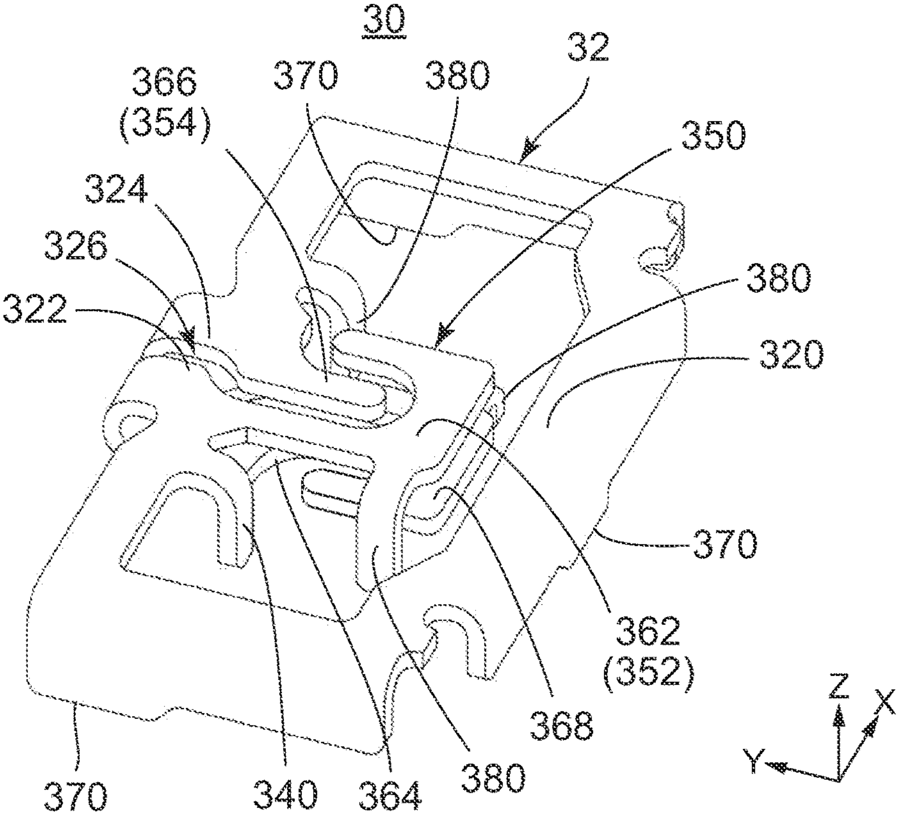
FIG. 3 is a perspective view showing the antenna component included in the multi-resonant antenna of FIG. 1.

Referring to FIG. 3, the antenna component 32 of the present embodiment is provided with a second main portion 320, a feeding leg portion 340 and a facing portion 350. The antenna component 32 is further provided with a plurality of grounding portions 370 and a plurality of fixing portions 380. The second main portion 320 forms a main portion of the main antenna 30 together with the first main portion 252 of the circuit board 20. In other words, in the present embodiment, the main portion of the main antenna 30 is formed of the first main portion 252 of the circuit board 20 and the second main portion 320 of the antenna component 32.

As shown in FIG. 3, a shape of the second main portion 320 of the present embodiment is an approximately rectangular ring shape long in a lateral direction. However, the present invention is not limited thereto. The shape of the second main portion 320 of the present invention may be any one of various ring shapes, such as not only the approximately rectangular ring shape but also a circular shape, oval shapes and polygonal ring shapes. In the present embodiment, the lateral direction is an X-direction. Specifically, the negative X-direction is also referred to as a first predetermined direction in the present embodiment.

As shown in FIG. 3, the second main portion 320 has a first end portion 322 and a second end portion 324. The first end portion 322 and the second end portion 324 are apart from and face each other to form a split portion 326. In other words, the second main portion 320 forms a split ring having the split portion 326.

As shown in FIG. 3, the feeding leg portion 340 branches off from the second main portion 320. In the present embodiment, the feeding leg portion 340 branches off from the second main portion 320 at a position closer to the first end portion 322 than to the second end portion 324. The feeding leg portion 340 extends rearward and then extends downward. The feeding leg portion 340 is connected to the feeding portion 210 when the main antenna 30 is mounted on the circuit board 20. In the present embodiment, a front-rear direction is a Y-direction. A positive Y-direction is directed forward while a negative Y-direction is directed rearward. Specifically, the positive Y-direction is also referred to as a second predetermined direction in the present embodiment. Moreover, in the present embodiment, an up-down direction is a Z-direction. A positive Z-direction is directed upward while a negative Z-direction is directed downward.

As shown in FIG. 3, the facing portion 350 has a first facing portion 352 and a second facing portion 354. The first facing portion 352 and the second facing portion 354 are apart from and face each other to form a capacitor. The first facing portion 352 and the second facing portion 354 are provided to the first end portion 322 of the second main portion 320 and the second end portion 324 of the second main portion 320, respectively. In the present embodiment, the first end portion 322 and the first facing portion 352 are integrally formed. Similarly, the second end portion 324 and the second facing portion 354 are integrally formed.

As shown in FIG. 3, the first facing portion 352 has a first upper facing portion 362, which extends downward from the first end portion 322, and a first lower facing portion 364, which extends forward from the first end portion 322 and then extends downward, and further extends rearward. Moreover, the second facing portion 354 has a second upper facing portion 366, which extends rearward from the second end portion 324, and a second lower facing portion 368, which extends forward from the second end portion 324 and then extends downward, and further extends rearward. However, the present invention is not limited thereto. In the present invention, provided that the first facing portion 352 and the second facing portion 354 are formed to a capacitor having a desired characteristic, their shapes and sizes are not limited particularly.

As understood from FIG. 3, the second main portion 320 forms an inductive component of the main antenna 30 because of the shape thereof. The first end portion 322 and the second end portion 324 form a capacitive component of the main antenna 30 together with the first facing portion 352 and the second facing portion 354. With this structure, the main antenna 30 is operable as an LC resonance circuit (a first resonance portion). The LC resonance circuit formed by the main antenna 30 is also called as a split ring resonator. Thus, the main antenna 30 forms the first resonance portion.

Referring again to FIG. 2, the feeding portion 210, the ground pattern 220, the additional radiation element 230 and the first main portion 252, which are formed on the circuit board 20, are formed by using a single conductive layer (the conductive pattern 200). In addition, the feeding portion 210, the ground pattern 220, the additional radiation element 230 and the first main portion 252 are contiguous to one another. However, the present invention is not limited thereto. The feeding portion 210, the ground pattern 220, the additional radiation element 230 and the first main portion 252 may be formed by using the conductive layers and the vias included in the multilayer wiring substrate.

As shown in FIG. 2, in the present embodiment, the conductive pattern 200 covers a surface of the circuit board 20 except for a predetermined area. The feeding portion 210 is formed in a slit 222 formed in the conductive pattern 200. The feeding portion 210 extends in the front-rear direction.

As understood from FIG. 1, the additional radiation element 230 extends outward of the main antenna 30. In detail, as shown in FIG. 2, the additional radiation element 230 extends outward of the main antenna 30 from the first main portion 252. In the present embodiment, the additional radiation element 230 has a base portion 232, which extends from the first main portion 252 in the second predetermined direction (the positive Y-direction), and a first extension portion 234, which extends from the base portion 232 in the first predetermined direction (the negative X-direction). However, the present invention is not limited thereto. The additional radiation element 230 may not have the base portion 232, provide that the additional radiation element 230 extends from the first main portion 252 in the first predetermined direction. Moreover, the additional radiation element 230 may extend outward of the main antenna 30 from the feeding portion 210. In that case, the base portion 232 may not have a linear shape but may have a shape with a bent portion. Moreover, a shape of the first extension portion 234 of the additional radiation element 230 may have a wide portion at a tip portion thereof.

As shown in FIG. 1, the additional radiation element 230 extends from near the first end portion 322 of the antenna component 32 and the feeding leg portion 340 in a plan view. In addition, the additional radiation element 230 does not overlap with the ground pattern 220 in a plan view. The additional radiation element 230 forms at least a part of a second resonance portion different from the first resonance portion. In detail, the additional radiation element 230 forms the second resonance portion solely or together with a part of the conductive pattern 200.

As shown in FIGS. 1 and 2, a clearance area 240 is formed between the first extension portion 234 of the additional radiation element 230 and the ground pattern 220. A size of the clearance area 240 is decided in consideration of a characteristic of the main antenna 30 and a characteristic of the additional radiation element 230.

As shown in FIG. 2, the ground pattern 220 has a second extension portion 224 and a third extension portion 226 which define the clearance area 240 in part. The second extension portion 224 is located apart from the first extension portion 234 of the additional radiation element 230 in the front-rear direction and extends from near the mount area 250 in the first predetermined direction. The third extension portion 226 extends from the second extension portion 224 in the second predetermined direction.

As shown in FIGS. 1 and 2, in the present embodiment, a tip of the first extension portion 234 of the additional radiation element 230 is apart from and faces the third extension portion 226 in the first predetermined direction.

An electrical length of the additional radiation element 230 is decided on the basis of a quarter of a length of a desired operating frequency. The desired operating frequency is different from an operating frequency of the main antenna 30.

In the multi-resonant antenna 10 formed as described above, the first resonance portion and the second resonance portion have the operating frequencies different from each other. In other words, the multi-resonant antenna 10 of the present embodiment can resonate at each of the operating frequency of the main antenna 30 and the operating frequency of the additional radiation element 230. The first resonance portion is connected to a resonance source (not shown) via the feeding portion 210. The second resonance portion is connected to the first resonance portion. Thus, the multi-resonant antenna 10 has a structure which can resonate at a plurality of operation frequencies.

In more detail, the multi-resonant antenna 10 of the present embodiment has the structure which can electrically resonate at two operation frequencies, one of which is an operating frequency of the LC resonance circuit which operates as the main antenna 30, and the other of which is an operating frequency of the additional radiation element 230 which depends on the electric length of the additional element 230.

Up to this point, the description has been made about the embodiment of the present invention, and the embodiment may be modified as follows.

(Modification 1)

Figure 4:
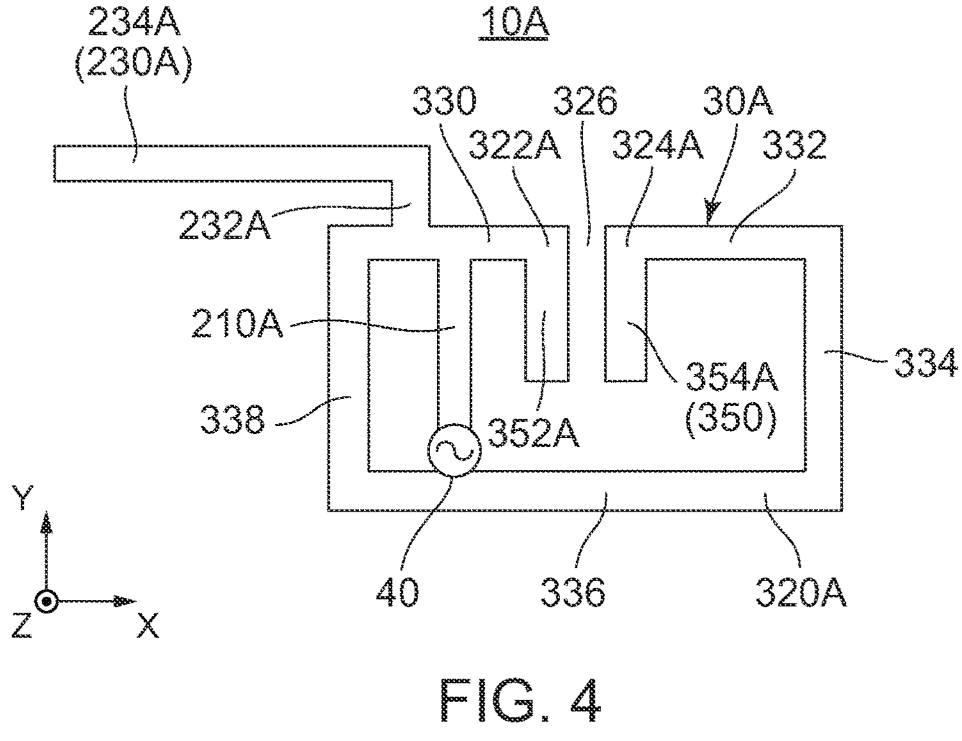
FIG. 4 is a schematic view showing a first modification of the multi-resonant antenna of FIG. 1.

As shown in FIG. 4, a multi-resonant antenna 10A of a first modification is provided with a main antenna 30A and an additional radiation element 230A. The main antenna 30A is provided with a main portion 320A, a feeding portion 210A, a grounding line portion 342 and a facing portion 350A. The multi-resonant antenna 10A is further provided with a substrate (not shown).

As understood from FIG. 4, in the multi-resonant antenna 10A of the first modification, the main antenna 30A and the additional radiation element 230A are integrally formed. A combination of the main antenna 30A and the additional radiation element 230A may be formed of a metal member which is mounted on the substrate (not shown), for example, when used. Alternatively, the combination of the main antenna 30A and the additional radiation element 230A may be formed of a conductive pattern (a pattern) or conductive patterns (patterns) formed on or in the substrate. Instead, a part of the combination of the main antenna 30A and the additional radiation element 230A may be formed of the conductive pattern(s) formed on or in the substrate and a remaining part of the combination of the main antenna 30A and the additional radiation element 230A may be formed of a metal member distinct and separated from the substrate.

As shown in FIG. 4, the main portion 320A has a first portion 330, a second portion 332, a third portion 334, a fourth portion 336 and a fifth portion 338. Each of the first portion 330 and the second portion 332 extends in the lateral direction. The first portion 330 and the second portion 332 are arranged in a first predetermined direction. The fourth portion 336 extends along the lateral direction. The fourth portion 336 is apart from the first portion 330 and the second portion 332 in the front-rear direction and arranged in parallel to the first portion 330 and the second portion 332. Each of the third portion 334 and the fifth portion 338 extends in the front-rear direction. The third portion 334 and the fifth portion 338 are arranged to be apart from and parallel to each other.

As shown in FIG. 4, the first portion 330 of the main portion 320A and the second portion 332 of the main portion 320A have a first end portion 322A and a second end portion 324A, respectively. The first end portion 322A and the second end portion 324A are apart from and face each other to form a split portion 326A. The third portion 334 of the main portion 320A joins the second portion 332 to the fourth portion 336. The fifth portion 338 of the main portion 320A joins the first portion 330 to the fourth portion 336. Thus, the main portion 320A forms a split ring having the split portion 326A. However, the present invention is not limited thereto. The main portion 320A may have another ring shape, such as a circular shape or an oval shape, provided that the main portion 320A forms a split ring.

As shown in FIG. 4, the feeding portion 210A branches off from the main portion 320A at a position closer to the first end portion 322A than to the second end portion 324A. Moreover, the additional radiation element 230A extends from the main portion 320A at another position closer to the first end portion 322A than to the second end portion 324A. In detail, each of the feeding portion 210A and the additional radiation element 230A branches off from the first portion 330 of the main portion 320A. In the lateral direction or the first predetermined direction, the additional radiation element 230A is farer from the first end portion 322A than the feeding portion 210A is. However, the present invention is not limited thereto. According to a desired characteristic, the additional radiation element 230A may be located at the same position as the feeding portion 210A or at a position closer to the first end portion 322A than the feeding portion 210A is. Moreover, the additional radiation element 230A may extend from not the main portion 320A but the feeding portion 210A according to the desired characteristic.

As shown in FIG. 4, the feeding portion 210A extends from the first portion 330 of the main portion 320A toward the fourth portion 336 along the front-rear direction. The substrate (not shown) is formed with a ground pattern (not shown), and the fourth portion 336 of the main portion 320A is electrically connected to the ground pattern. Alternatively, the fourth portion 336 of the main portion 320A may be a part of the ground pattern. An end portion of the feeding portion 210A is connected to a feeding line (not shown) or a circuit element (not shown) in order to serve as a driving point 40. Additionally, at least one of the third portion 334 of the main portion 320A, the fourth portion 336 of the main portion 320A and the fifth portion 338 of the main portion 320A should be connected to the ground pattern.

As shown in FIG. 4, the additional radiation element 230A extends outward of the main antenna 30A from the main portion 320A of the main antenna 30A. In detail, the additional radiation element 230A has a base portion 232A, which extends from the first portion 330 of the main portion 320A in the second predetermined direction, and a first extension portion 234A, which extends from the base portion 232A in the first predetermined direction. When the substrate (not shown) has the ground pattern (not shown), the additional radiation element 230A is formed not to overlap with the ground pattern in a plan view. However, the present invention is not limited thereto. Provided that the additional radiation element 230A has the first extension portion 234A, it may not have the base portion 232A. Moreover, a shape of the first extension portion 234A is not limited to a rectangular shape but may have a wide portion at a tip portion thereof. The additional radiation element 230A corresponds to a quarter of a wavelength of a desired operating frequency.

As shown in FIG. 4, the facing portion 350A has a first facing portion 352A and a second facing portion 354A. The first facing portion 352A and the second facing portion 354A extend from the first end portion 322A and the second end portion 324A, respectively, in the front-rear direction. The first facing portion 352A and the second facing portion 354A also extend inward of the main portion 320A. The first facing portion 352A and the second facing portion 354A are apart from each other by a predetermined distance and arranged in parallel with each other. However, the present invention is not limited thereto. Provided that the first facing portion 352A and the second facing portion 354A form a capacitor having a predetermined characteristic, their shapes are not limited particularly. Moreover, when the main portion 320A is formed by a pattern on the substrate (not shown), the first facing portion 352A and the second facing portion 354A may be made of metal members which are distinct and separated from the substrate.

As understood from FIG. 4, in the multi-resonant antenna 10A, the main antenna 30A is fed from the driving point 40. The additional radiation element 230A is connected to the main antenna 30A. With this structure, the main antenna 30A operates as a split ring resonator (an LC resonance circuit or a first resonance portion), and the additional radiation element 230A operates as a second resonance portion different from the first resonance portion. The first resonance portion and the second resonance portion have resonance frequencies different from each other. Thus, the multi-resonant antenna 10A of the first modification has the structure which can electrically resonate at two operating frequencies, one of which is an operating frequency of the main antenna (a first resonance portion) 30A, and the other of which is an operating frequency of the additional radiation element (a second resonance portion).

[Modification 2]

Figure 5:
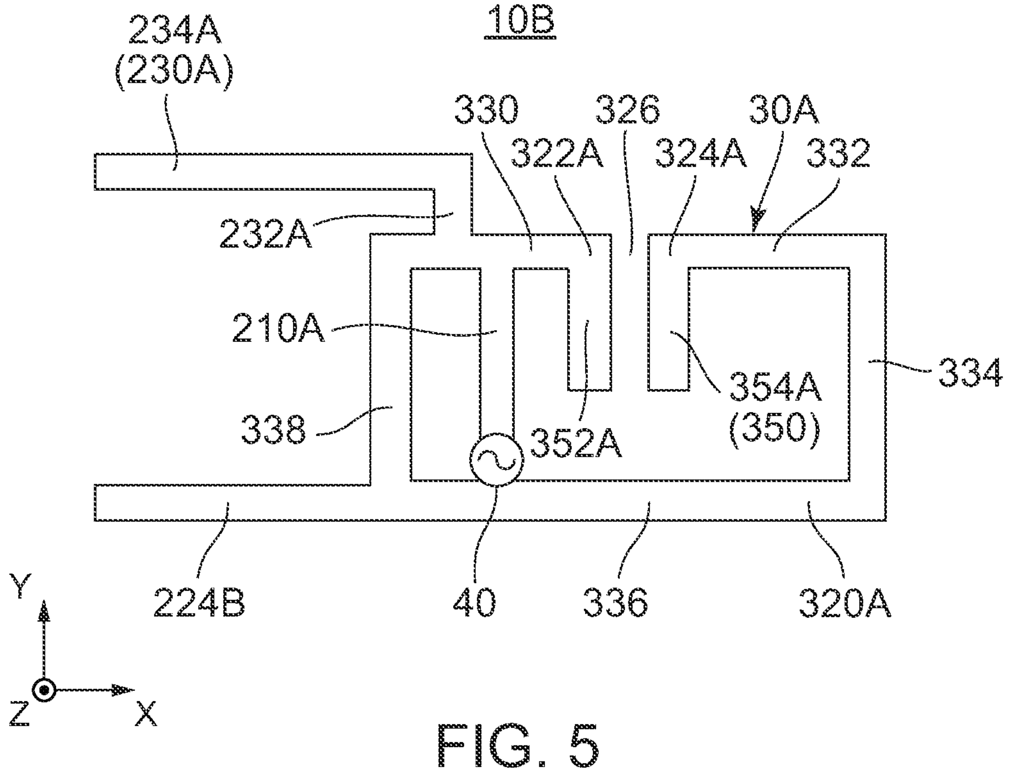
FIG. 5 is a schematic view showing a second modification of the multi-resonant antenna of FIG. 1.

As shown in FIG. 5, a multi-resonant antenna 10B of a second modification is provided with a second extension portion (a ground portion) 224B in addition to the structure of the multi-resonant antenna 10A of the first modification. Since the multi-resonant antenna 10B is the same as the multi-resonant antenna 10A of the first modification except for the second extension portion 224B, the detailed description of points other than the second extension portion 224B will be omitted.

As shown in FIG. 5, the second extension portion 224B extends from an end of the fourth portion 336 of the main portion 320A in the first predetermined direction. In other words, the second extension portion 224B is arranged to be parallel to the additional radiation element 230A. In the second predetermined direction, the second extension portion 224B is apart from the additional radiation element 230A. When the main antenna 30A is made of a metal member, the second extension portion 224B may be integrally formed with the main antenna 30A by using the metal member. Alternatively, the second extension portion 224B may be formed of a conductive pattern (not shown) of a substrate (not shown). Instead, the second extension portion 224B may be connected to a ground pattern (not shown) of the substrate or may be a part of the ground pattern. However, in a plan view, the ground pattern does not exist between the second extension portion 224B and the additional radiation element 230A.

As understood from FIG. 5, the multi-resonant antenna 10B of the present modification also has a structure which can resonate at the two operating frequencies, one of which is the operating frequency of the main antenna (the first resonance portion) 30A, and the other of which is the operating frequency of the additional radiation element (the second resonance portion) 230A.

[Modification 3]

Figure 6:
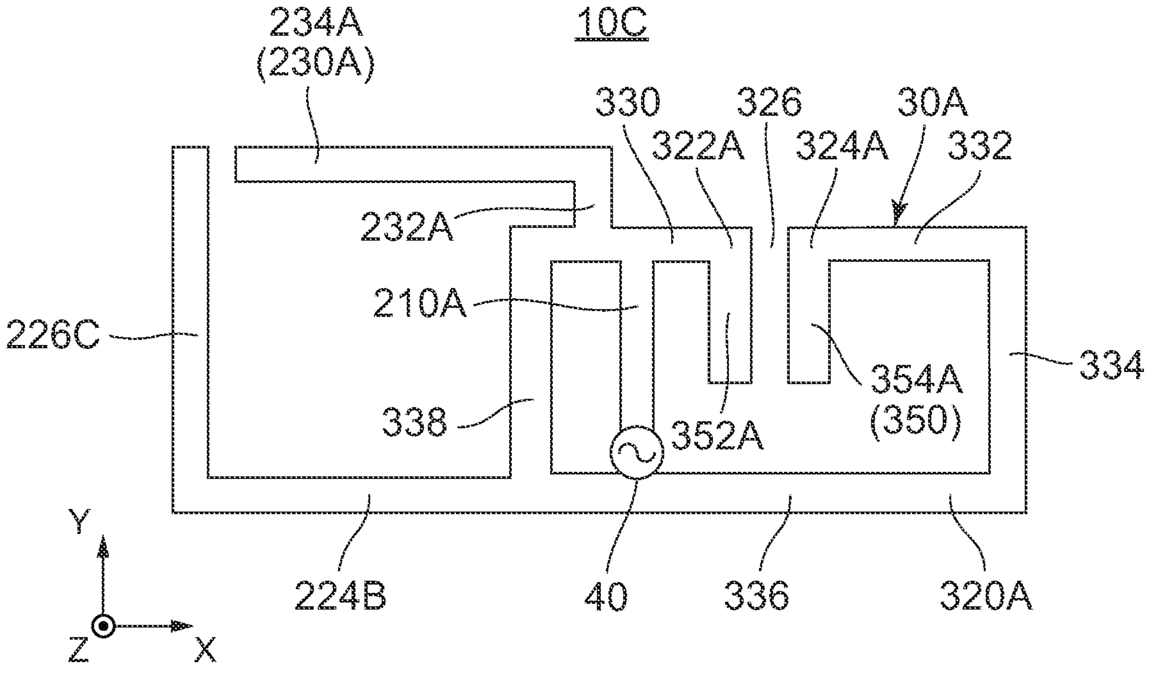
FIG. 6 is a schematic view showing a third modification of the multi-resonant antenna of FIG. 1.

As shown in FIG. 6, a multi-resonant antenna 10C of a third modification is provided with a third extension portion (a ground portion) 226C in addition to the structure of the multi-resonant antenna 10B of the second modification. Since the multi-resonant antenna 10C is the same as the multi-resonant antenna 10B of the second modification except for the third extension portion 226C, the detailed description of points other than the third extension portion 226C will be omitted.

As shown in FIG. 6, the third extension portion 226C extends from an end of the second extension portion 224B in the second predetermined direction. The third extension portion 226C and the additional radiation element 230A do not intersect with each other. In detail, a tip portion of the third extension portion 226C is apart from the additional radiation element 230A. In the present modification, the third extension portion 226C does not protrude forward of the additional radiation element 230A in the front-rear direction. However, the present invention is not limited thereto. The third extension portion 226C may protrude forward of the additional radiation element 230A in the front-rear direction. At any rate, in the lateral direction or the first predetermined direction, a tip of the additional radiation element 230A is apart from the third extension portion 226C and faces the third extension portion 226C. The third extension portion 226C may be formed of a metal member or may be formed of a conductive pattern (not shown) of a substrate (not shown). Alternatively, the third extension portion 226C may be connected to a ground pattern (not shown) of the substrate or may be a part of the ground pattern. However, in a plan view, the ground pattern does not exist between the third extension portion 226C and the additional radiation element 230A.

As understood from FIG. 6, the multi-resonant antenna 10C of the present modification also has a structure which can electrically resonate at the two operating frequencies, one of which is the operating frequency of the main antenna (the first resonance portion) 30A, and the other of which is the operating frequency of the additional radiation element (the second resonance portion) 230A.

[Modification 4]

Figure 7:
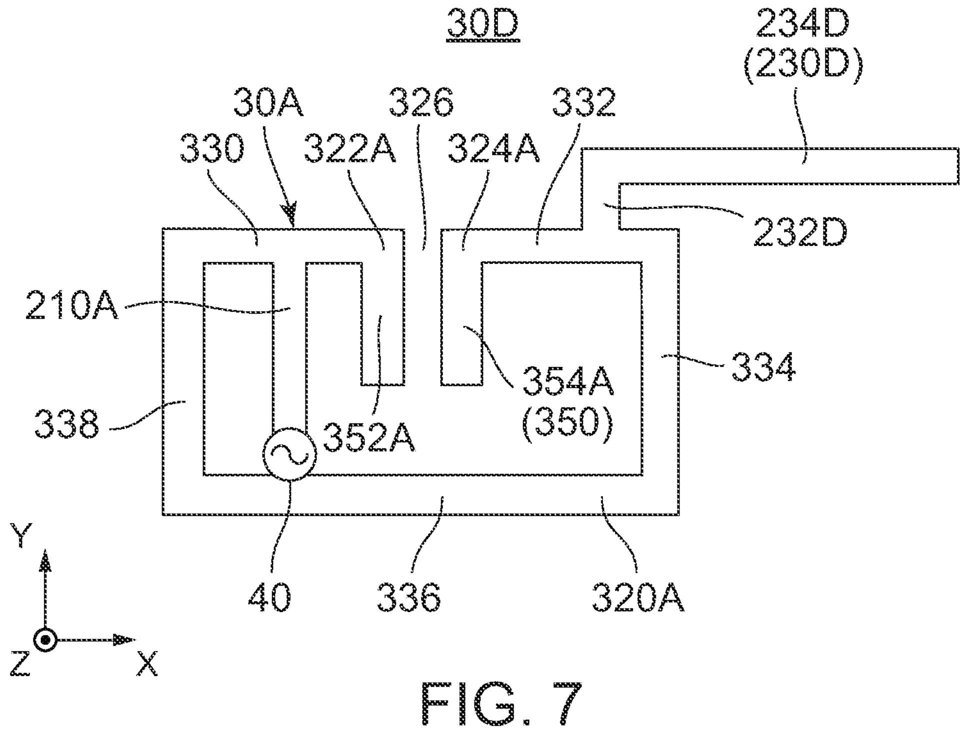
FIG. 7 is a schematic view showing a fourth modification of the multi-resonant antenna of FIG. 1.
Figure 8:
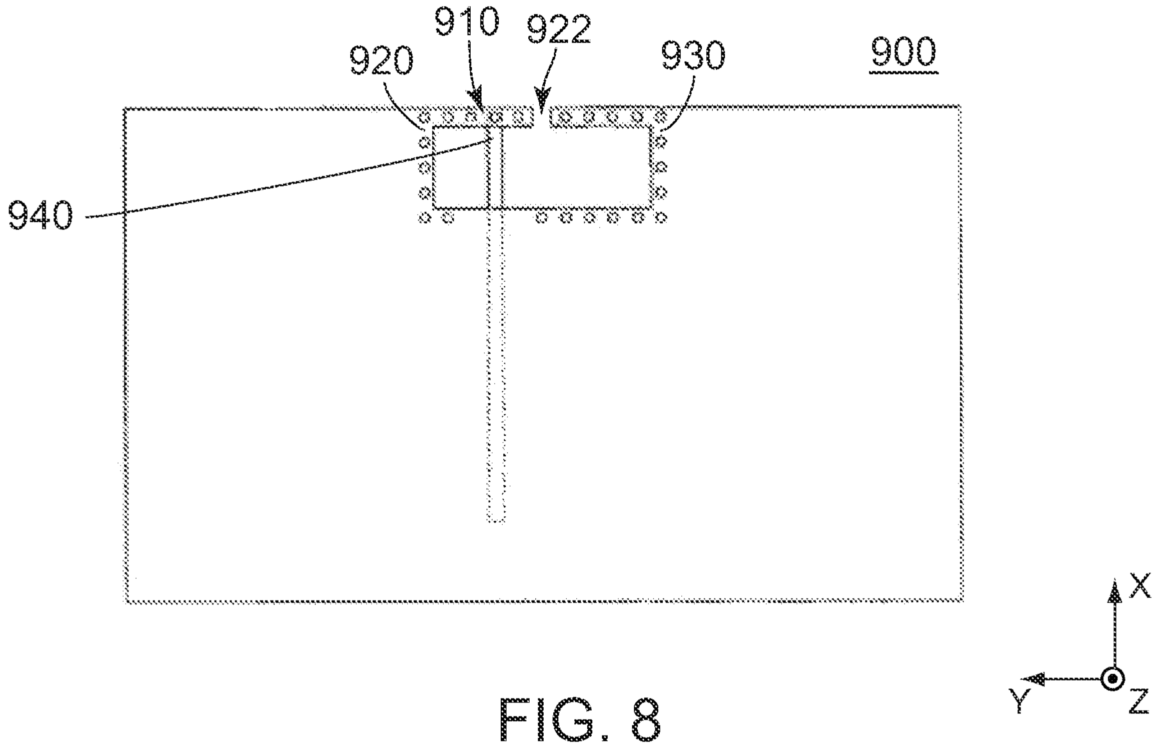
FIG. 8 PRIOR ART
FIG. 8 is a top view showing an antenna disclosed in Patent Document 1.

As shown in FIG. 7, a multi-resonant antenna 10D of a fourth modification is provided with an additional radiation element 230D in place of the additional radiation element 230A of the multi-resonant antenna 10A of the first modification. Since the multi-resonant antenna 10D is the same as the multi-resonant antenna 10A of the first modification except for the additional radiation element 230D, the detailed description of points other than the additional radiation element 230D will be omitted.

As shown in FIG. 7, the additional radiation element 230D branches off from the second portion 332 of the main portion 320A. The additional radiation element 230D has a base portion 232D, which extends from the second portion 332 of the main portion 320A in the second predetermined direction, and a first extension portion 234D, which extends in a direction opposite to the first predetermined direction. The additional radiation element 230D is formed in order to correspond to a quarter of a wavelength of a desired operating frequency. When a substrate (not shown) has a ground pattern (not shown), the additional radiation element 230D is formed not to overlap with the ground pattern in a plan view. However, the present invention is not limited. Provided that the additional radiation element 230D has the first extension portion 234D, it may not have the base portion 232D. Moreover, a shape of the first extension portion 234D is not limited to a rectangular shape but may have a wide portion at a tip portion thereof. Furthermore, the multi-resonant antenna 10D of FIG. 7 may be further added with an extension portion corresponding to the second extension portion 224B shown in FIG. 5. Yet furthermore, the multi-resonant antenna 10D of FIG. 7 may be further added with two extension portions corresponding to the second extension portion 224B and the third extension portion 226C which are shown in FIG. 6.

As understood from FIG. 7, the multi-resonant antenna 10D of the present modification also has a structure which can electrically resonate at the two operating frequencies, one of which is the operating frequency of the main antenna (the first resonance portion) 30A, and the other of which is the operating frequency of the additional radiation element (the second resonance portion) 230D.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A multi-resonant antenna comprising:
- a substrate having a pattern formed thereon;
- a main antenna; and
- an additional radiation element,
- wherein:
- the main antenna comprises a main portion, which forms a split ring, and a feeding portion, which branches off from the main portion;
- the additional radiation element extends outward of the main antenna from the main antenna;
- the main antenna forms a first resonance portion;
- the first resonance portion comprises an LC resonance circuit;
- the additional radiation element forms at least a part of a second resonance portion different from the first resonance portion;
- the main portion of the main antenna is formed of a combination of (i) at least one part of the pattern formed on the substrate and (ii) a metal member which is distinct from the substrate and mounted on the substrate, at least one portion of the metal member being separated from the substrate.

2. The multi-resonant antenna as recited in claim 1, wherein:
- the multi-resonant antenna comprises a ground portion; and
- the additional radiation element does not overlap with the ground portion in a plan view.

3. The multi-resonant antenna as recited in claim 2, wherein:
- the additional radiation element has a first extension portion extending in a first predetermined direction; and
- the ground portion has a second extension portion which is apart from the first extension portion in a second predetermined direction perpendicular to the first predetermined direction and which extends in the first predetermined direction.

4. The multi-resonant antenna as recited in claim 3, wherein:
- the ground portion has a third extension portion extending from the second extension portion in the second predetermined direction; and
- the first extension portion of the additional radiation element has a tip which is apart from and faces the third extension portion in the first predetermined direction.

5. The multi-resonant antenna as recited in claim 1, wherein the additional radiation element extends from the main portion of the main antenna.

6. The multi-resonant antenna as recited in claim 1, wherein the additional radiation element is formed of at least another part of the pattern formed on the substrate.

7. The multi-resonant antenna as recited in claim 1, wherein:
- the main portion of the main antenna has a first end portion and a second end portion;
- the feeding portion branches off from the main portion of the main antenna at a position closer to the first end portion than to the second end portion; and
- the additional radiation element extends from the main portion of the main antenna at a position closer to the first end portion than to the second end portion, or extends from the feeding portion.

8. The multi-resonant antenna as recited in claim 2, wherein the ground portion is integrally formed with the main portion of the main antenna.

9. The multi-resonant antenna as recited in claim 2, wherein the ground portion is formed of at least one part of the pattern formed on the substrate.

* * * * *